(12) United States Patent
Terasaki (10) Patent No.: US 7,423,506 B2
(45) Date of Patent: Sep. 9, 2008

(54) ANNULAR MAGNET (75) Inventor: Atsushi Terasaki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 112 days.

(21) Appl. No.: 11/481,803

(22) Filed: Jul. 7, 2006

(65) Prior Publication Data

US 2007/0024405 A1  Feb. 1, 2007

(30) Foreign Application Priority Data

Jul. 29, 2005  (JP) .............................. 2005-221837

(51) Int. Cl.
*H01F 7/02* (2006.01)

(52) U.S. Cl. .................... 335/306; 335/281; 335/283; 335/285; 335/296; 335/302

(58) Field of Classification Search ................. 335/281, 335/283, 285, 296, 302, 306
See application file for complete search history.

(56) References Cited

U.S. PATENT DOCUMENTS

| | | | | | |
|---|---|---|---|---|---|
| 2,360,928 | A | * | 10/1944 | Beechlyn ..................... 335/288 |
| 2,660,726 | A | * | 12/1953 | Weingart ....................... 227/11 |
| 3,585,550 | A | * | 6/1971 | Dorsch et al. ................. 335/302 |
| 3,852,692 | A | * | 12/1974 | Moorman ..................... 335/205 |
| 4,002,937 | A | * | 1/1977 | Anson ........................ 310/168 |
| 4,405,286 | A | * | 9/1983 | Studer ............................ 417/1 |
| 4,555,685 | A | * | 11/1985 | Maruyama ................... 335/303 |
| 4,793,241 | A | * | 12/1988 | Mano et al. ................... 92/5 R |
| 4,835,505 | A | * | 5/1989 | Hattori et al. ................ 335/302 |
| 4,998,084 | A | * | 3/1991 | Alff ............................ 335/306 |
| 5,323,133 | A | * | 6/1994 | Heath et al. .................. 335/222 |
| 5,615,618 | A | * | 4/1997 | Berdut ........................ 104/290 |
| 5,625,239 | A | * | 4/1997 | Persson et al. ............. 310/68 B |
| 6,020,805 | A | * | 2/2000 | Børja ........................ 336/84 M |
| 6,094,119 | A | * | 7/2000 | Reznik et al. ................ 335/284 |
| 6,310,473 | B1 | * | 10/2001 | Zhao ...................... 324/207.25 |
| 6,703,829 | B2 | * | 3/2004 | Tola ....................... 324/207.25 |
| 2001/0018862 | A1 | * | 9/2001 | Sakurai et al. ................ 92/5 R |
| 2002/0017190 | A1 | * | 2/2002 | Sakurai ........................ 92/5 R |
| 2004/0250632 | A1 | * | 12/2004 | Schroeder et al. ....... 73/862.332 |
| 2007/0052312 | A1 | * | 3/2007 | Stanetskiy et al. ........... 310/152 |

FOREIGN PATENT DOCUMENTS

JP  3084074  6/2000

* cited by examiner

*Primary Examiner*—Elvin Enad
*Assistant Examiner*—Mohamad A Musleh
(74) *Attorney, Agent, or Firm*—Oblon, Spivak, McClelland, Maier & Neustadt, P.C.

(57) ABSTRACT

An annular magnet is formed by coupling a plurality of arc-shaped divided magnets with each other in an annular shape as well as such being magnetized with N and S magnetic poles on the end surfaces thereof in an axial direction, wherein the annular magnet is formed such that each of the divided magnets has joint portions at both ends thereof so that the divided magnets are joined to each other. Each of the joint portions also has a joint surface to overlap the joint portions of adjacent divided magnets in the axial direction. The joint surface is magnetized to a magnetic pole different from that of a joint surface to which such is joined, and the divided magnets are coupled with each other by the magnetic attraction force of different magnet poles.

14 Claims, 6 Drawing Sheets

FIG. 14

ANNULAR MAGNET

TECHNICAL FIELD

The present invention relates to an annular magnet arranged by coupling a plurality of arc-shaped divided magnets.

BACKGROUND ART

In, for example, a fluid pressure cylinder having a cylinder tube and a piston driven in the cylinder tube, an annular magnet is conventionally attached to an annular groove formed around the piston to detect a driving position of the piston as well as a sensor for detecting the magnetic force of the magnet is attached to the cylinder tube.

This type of annular magnet is attached to the piston by a method of dividing the piston into two portions in an axial direction and fitting the annular magnet into a groove formed between the two portions, or a method of dividing the annular magnet into two semicircular magnets, fitting the two semicircular magnets into an annular groove formed around the outer circumference of the piston from both the sides of it, and bonding the ends of the magnets to each other, or the like.

However, the former method is defective in that since the piston must be divided into the two portions, it is manufactured by a complex process and the cost thereof is increased, whereas the latter method is defective in that a repulsion force is generated from the bonded ends at which the same poles confront with each other, and the bonding job therefore is made more difficult (See Japanese Patent No. 3084074-AO ref. 1).

Further, when a soft magnet is used for the above annular magnet, an annular magnet can be attached to a piston arranged integrally by cutting off the annular magnet at one position, fitting it into an annular groove formed around the outer circumference of the piston while deforming it, and then bonding the end surfaces of the cut-off portions to each other. However, such is the same as the above magnet in that a repulsion force is also generated between the same poles in the end surfaces, and the bonding job therefore is made difficult.

Accordingly, it is desired to simply attach the annular magnet to a piston and the like.

DISCLOSURE OF THE INVENTION

A technical problem of the present invention is to solve the above problems and to provide an annular magnet that can be easily and simply attached to an annular groove formed to a piston and the like.

To solve the above technical problem, there is provided, according to the present invention, an annular magnet formed by coupling a plurality of arc-shaped divided magnets with each other in an annular shape as well as magnetized with N and S magnetic poles on both end surfaces thereof in an axial direction, the annular magnet being characterized in that each of the divided magnets have joint portions at both the ends thereof so that the divided magnets are joined to each other as well as each of the joint portions has a joint surface to overlap the joint portions of adjacent divided magnets in the axial direction, the joint surface is magnetized to a magnetic pole different from that of a joint surface to which it is joined, and the divided magnets are coupled with each other by the magnetic attraction force of different magnet poles.

In the present invention, the respective divided magnets are preferably arranged such that the joint portions thereof are formed narrower than a magnet width as well as a total width when the joint portions of adjacent divided magnets are joined to each other is equal to the magnet width.

In a specific embodiment of the present invention, each of the divided magnets may have such an arrangement such that one of the joint portions is biased to the side of an N-pole surface and the other joint portion is biased to the side of an S-pole surface, an S-pole is magnetized to the joint surface of the joint portion biased to the side of the N-pole surface, and an N-pole is magnetized to the joint surface of the joint portion biased to the side of the S-pole surface.

Further, in another embodiment, the plurality of divided magnets may comprise divided magnets, any of the joint portions of each of which at both the ends thereof, is biased to the side of an S-pole surface and divided magnets any of the joint portions of each of which at both the ends thereof is biased to the side of an N-pole surface, an S-pole may be magnetized to the joint surfaces of the joint portions biased to the side of the N-pole surface, and an N-pole may magnetized to the joint surfaces of the joint portions biased to the side of the S-pole surface.

In the present invention, each of the joint portions may have an arc-shaped outer circumferential contour portion extending along the outer circumference of the annular magnet and an arc-shaped inner circumferential contour portion extending along the inner circumference of the annular magnet, and the joint portion may be formed to an arc shape in its entirety and have the same thickness as a magnet thickness.

Otherwise, the annular magnet may comprise two divided magnets, the joint portions at both the ends thereof may have an arc-shaped outer circumferential contour portion extending along the outer circumference of the annular magnet and an inner circumferential contour portion extending along a straight line in contact with the inner circumference of the annular magnet, whereby each of the joint portions may be formed to a half-moon shape in its entirety.

In the present invention, a projection and a recess, which are engaged with each other, are preferably formed to the joint portions, which are joined to each other, of adjacent divided magnets.

In the present invention, each of the divided magnets may comprise two arc-shaped magnet pieces, the divided magnet may be formed by overlapping the magnet pieces while dislocating the positions of them in a circumferential direction, and the joint portions may be formed by the ends of both the magnetic pieces.

As described above, according to the present invention, since the annular magnet is formed of the divided magnets magnetically joined to each other, the annular magnet can be easily and simply attached to a piston and the like. Further, a fluid pressure cylinder, in which a position of a piston can be detected, can be easily made at low cost using the annular magnet.

BEST MODE FOR CARRYING OUT THE INVENTION

An annular magnet of the present invention and a fluid pressure cylinder using the annular magnet will be explained below in detail based on the embodiments shown in the figures.

Figure 1:
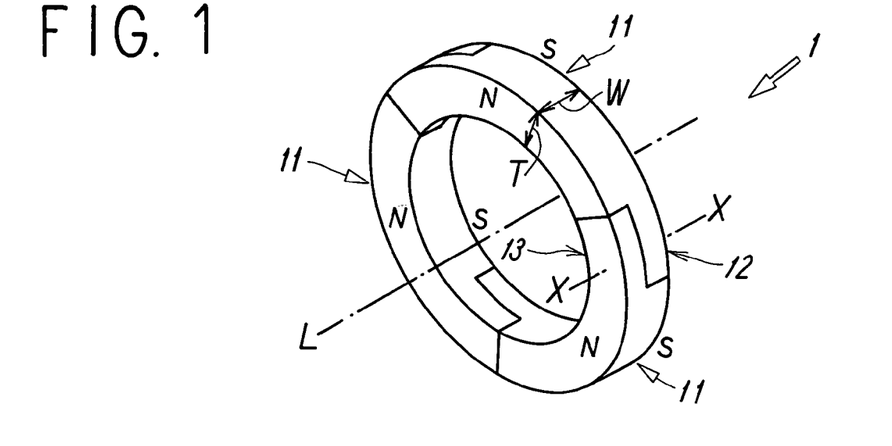
FIG. 1 is a perspective view showing an annular magnet of a first embodiment of the present invention.
Figure 2:
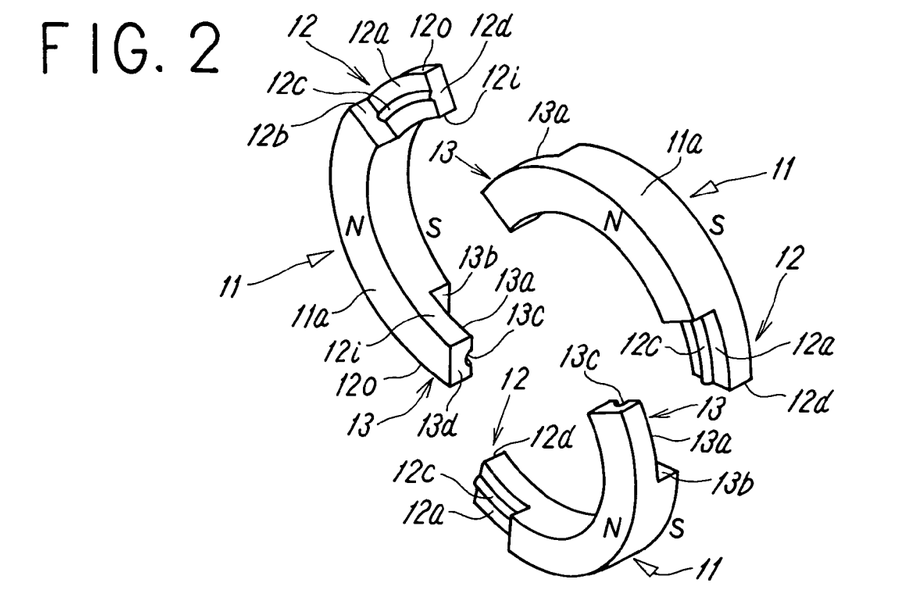
FIG. 2 is an exploded perspective view of the annular magnet of the first embodiment.

FIGS. 1 and 2 show a first embodiment of an annular magnet according to the present invention. The annular magnet 1 is magnetized such that one end surface thereof in the direction of a center axis L is made to an N-pole surface and the opposite end surface of it is made to an S-pole surface. The annular magnet 1 is formed of three arc-shaped divided magnets 11 that can be obtained by equally dividing the annular magnet 1 into three portions in a circumferential direction.

It should be noted here that "equally dividing" described above does not mean to simple divide the annular magnet to an equal length in the circumferential direction of it and instead means to divide the annular magnet to divided magnets each having joint portions, which will be described below, at both the ends of the same and having a shape such that when the divided magnets are joined to each other through the joint portions, they are accurately formed to an annular shape.

As shown in FIG. 2, since each of the three divided magnets 11 has the same arrangement and includes a main portion 11*a* having the same width as the magnet width W of the annular magnet and the same thickness as the magnet thickness T of it and a first joint portion 12 and a second joint portion 13 formed to both the ends of the main portion 11*a* to couple the divided magnet 11 with other divided magnets 11. These joint portions 12, 13 are formed by making the width of both the ends of the arc-shaped divided magnet 11 to about one half the magnet width W while keeping the thickness of both the ends equal to the magnet thickness T. In these joint portions 12, 13, the first joint portion 12 on one hand is formed to a state in which it is biased to the side of an S-pole surface by cutting off one half of the width of it on the side of an N-pole surface, and the second joint portion 13 on the other hand is formed to a state in which it is biased to the side of an N-pole surface by cutting off one half of the width of it the side of the S-pole surface. Then, the side surfaces of the joint portions 12, 13 which have become dented in a width direction, that is, the side surfaces of them to which stepped end surfaces 12*b*, 13*b* are formed act as joint surfaces 12*a*, 13*a* to be joined to the joint portions 12, 13 of other divided magnet 11. In this case, an N-pole appears in the joint surface 12*a* of the first joint portion 12, and an S-pole appears in the joint surface 13*a* of the second joint portion 13.

Accordingly, the first and second joint portions 12, 13 are formed in an arc-shape in an opposite direction along the center axis L at both the ends of the divided magnet 11, and the inner circumferential contour portions 12*i* and the outer circumferential contour portions 12*o* of the joint portions are in agreement with the inner circumferential surface and the outer circumferential surface of the annular magnet 1, respectively. Note that the extreme end surfaces 12*d*, 13*d* and the stepped end surfaces 12*b*, 13*b* of the joint portions 12, 13 are flat surfaces that interest with the circumference of the annular magnet 1 at right angles.

When the three divided magnets 11 are circularly overlapped and the joint surface 12*a* of the first joint portion 12 of one of adjacent divided magnets 11, 11 is joined to the joint surface 13*a* of the second joint portion 13 of the other of them in the center axis L, both the divided magnets 11, 11 are integrally coupled with each other by magnetic adsorption force acting between the joint surfaces 12*a*, 13*a*. As a result, the annular magnet 1 having a uniform cross section over the entire circumference of it is formed.

Note that the first and second joint portions 12, 13 need not always have the same width and may have a different width. In short, it is sufficient that the total width of the joint portions 12, 13 when they are overlapped to each other is equal to the width W of the annular magnet 1. Further, although the joint surfaces 12*a*, 13*a* are formed to flat surfaces facing in a direction perpendicular to the center axis L of the annular magnet 1, they may be flat surfaces or curved surfaces that tilt with respect to the center axis L as long as they can be overlapped in the direction of the center axis L.

Figure 3:
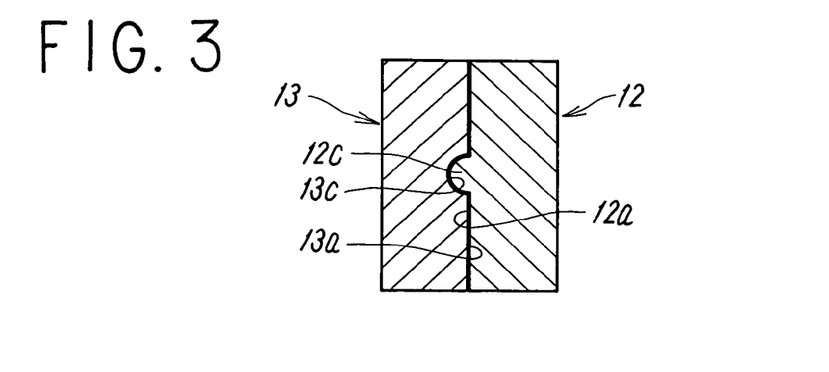
FIG. 3 is a sectional view showing a cross section at an X-X position of FIG. 1.

As shown in FIG. 3, in the annular magnet 1, a projection 12*c* extending in a circumferential direction is formed to one of the joint surfaces 12*a*, 13*a* joined to each other, and a recess 13*c*, with which the projection 12*c* is engaged, is disposed to engage in the circumference direction thereof. As a result, the joint portions 12, 13 can be prevented from being dislocated in the diameter direction of the annular magnet by the engagement of the projection 12*c* with the recess 13*c*, thereby the divided magnets 11 can be coupled with each other very strongly.

However, the projection 12*c* and the recess 13*c* are formed as necessary and are not always essential.

Figure 12:
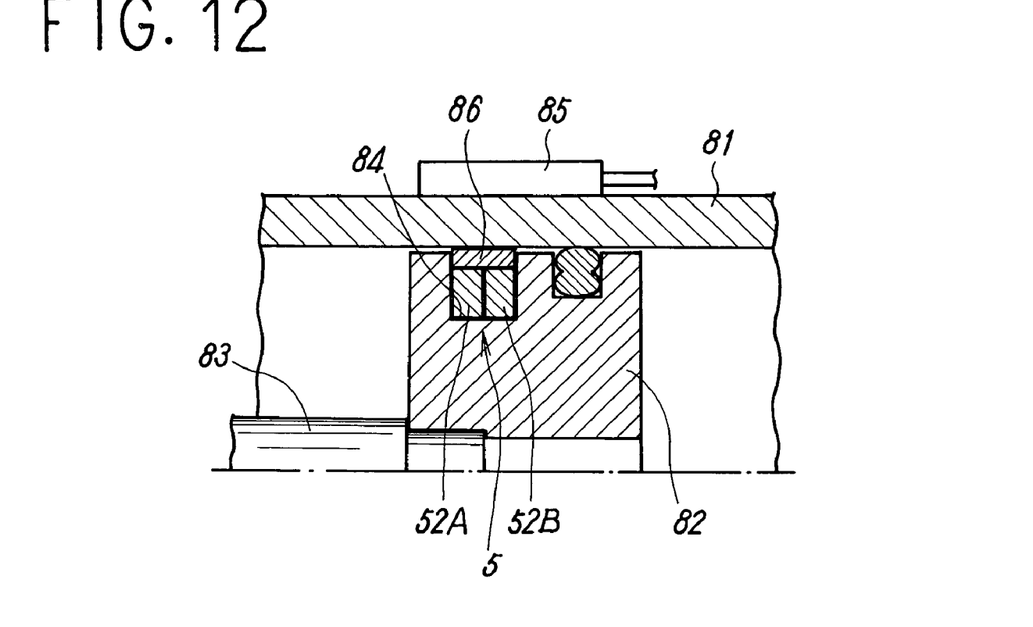
FIG. 12 is a partial semi-sectional view of a fluid pressure cylinder to which an annular magnet of the present invention is attached.
Figure 13:
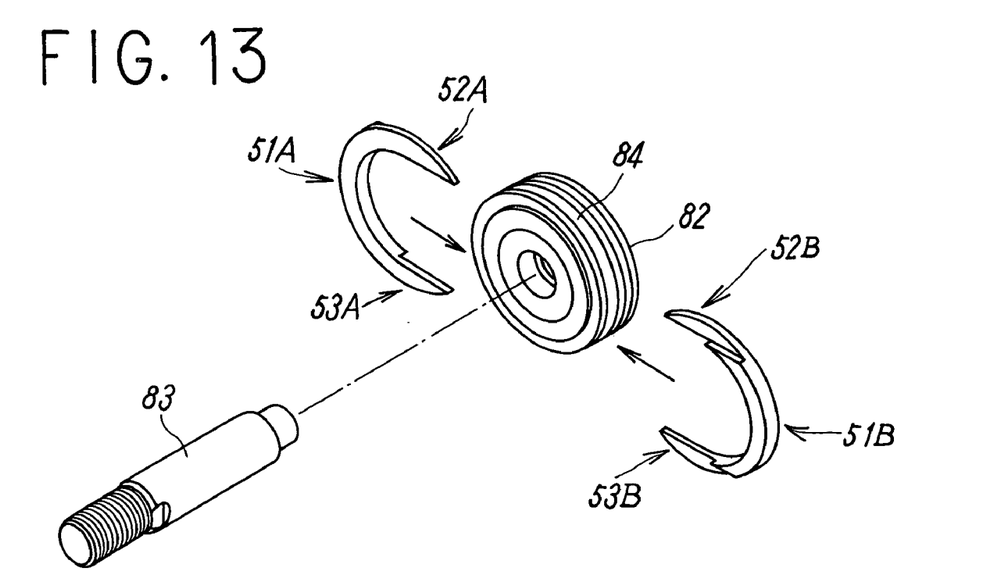
FIG. 13 is an exploded perspective view of a main portion of the fluid pressure cylinder.

Since the annular magnet 1 having the above arrangement is equally divided into the three portions in the circumferential direction, when such is attached to an annular groove of a fluid pressure cylinder on the outer circumference of it and used to detect a position of a piston as shown in, for example, FIGS. 12 and 13, such can be easily and securely attached to the annular groove. Moreover, since the divided magnets 11 are coupled with each other by the magnetic adsorption force acting on the joint surfaces 12*a*, 13*a* of them, they can be easily coupled with each other without the need of an adhesive and the like to couple the divided magnets.

Note that when the divided magnets 11 are joined to each other, magnetic repulsion force acts between the stepped end surfaces 12*b*, 13*b* and the extreme end surfaces 12*d*, 13*d* of the joint portions 12, 13 abutted against them. However, since the magnetic attraction force acting between the joint surfaces 12*a*, 13*a* is larger than the magnetic repulsion force, both the divided magnets are securely coupled with each other and are not separated from each other.

The divided magnets 11 are not limited to those obtained by dividing the annular magnet 1 to the three portions and may be those obtained by dividing it to two, four or more than four portions.

Figure 4:
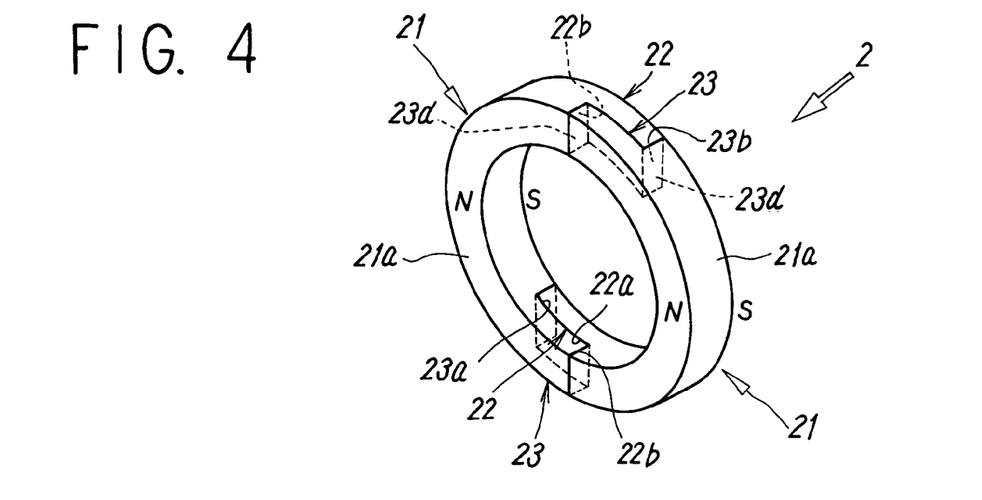
FIG. 4 is a perspective view showing an annular magnet of a second embodiment of the present invention.

An annular magnet 2 of a second embodiment shown in FIG. 4 is formed of divided magnets 21 obtained by equally dividing the annular magnet 2 to two portions and having the same arrangement. The arrangement of first and second joint portions 22, 23 formed at both the sides of a main portion 21a of each divided magnet 21 is the same as the arrangement of the first and second joint portions 12, 13 of the divided magnet 11 of the first embodiment. However, in the divided magnet 21 on one hand, any of the joint portions 22, 23 at both the ends of it may be disposed to the side of an N-pole surface, whereas, in the divided magnet 21 on the other hand, any of the joint portions 22, 23 at both the ends of it may be disposed to the side of an S-pole surface.

When the annular magnet 2 is attached to an annular groove of a piston and the like likewise the annular magnet 1 of the first embodiment, such may not be inserted into the annular groove is because of the relation of an opening width of the divided magnets 21. In this case, the annular magnet 2 is inserted into the annular groove even in the above opening width by partly scraping off the bottom of the annular groove or the joint portions 22, 23. Otherwise, the annular magnet 2 can be attached to the annular groove by a means of reducing the joint surfaces 22a, 23a of the joint portions 22, 23 of the annular magnet 2 or providing the material of the divided magnets 21 with some degree of elasticity. Note that the arrangement of the second embodiment is advantageous in that the number of parts is reduced.

In the first and second embodiments, the extreme end surfaces 12d, 13d, 22d, 23d and the stepped end surfaces 12b, 13b, 22b, 23b of the joint portions 12, 13, 22, 23 of the respective divided magnets 11, 21 are formed to the flat surfaces that are perpendicular to the circumferences of the annular magnets 1, 2. However, as in an annular magnet 3 of a third embodiment shown in FIG. 5, the extreme end surfaces 32d, 33d and the stepped end surfaces 32b, 33b of two joint portions 32, 33 at both the ends of a divided magnet 31 may be formed with flat surfaces or curved surfaces that tilt with respect to the circumference of the annular magnet 3. With this arrangement, the joint portions 32, 33 coupled with each other can be suppressed from being dislocated. The joint surfaces 32a, 33a of the joint portions 32, 33 are formed to flat surfaces perpendicular to the center axis L of the annular magnet likewise the first embodiment.

Figure 6:
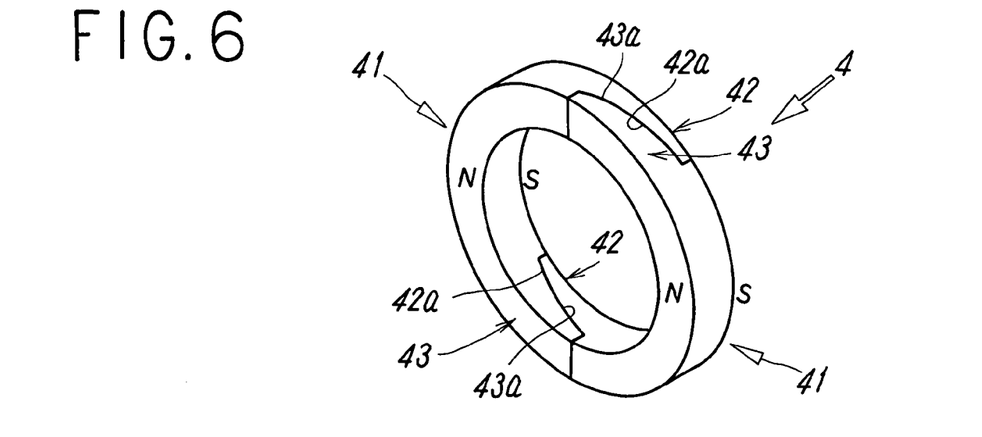
FIG. 6 is a perspective view showing an annular magnet of a fourth embodiment of the present invention.

FIG. 6 shows an annular magnet 4 of a fourth embodiment of the present invention. Although the annular magnet 4 is composed of two divided magnets 41 likewise the second embodiment, the joint portions of the divided magnets 41 have a shape different from that of the divided magnets 21 of the second embodiment. That is, in the annular magnet 4, the joint surfaces 42a, 43a of the first and second joint portions of the divided magnet 41 are tilted in an opposite direction with respect to the center axis of the annular magnet 4 so that the thickness thereof is gradually reduced toward the extreme end of them. When the two divided magnets 41 are combined with each other, the first and second tilted joint surfaces 42a, 43a are overlapped and coupled with each other by magnetic attraction force likewise the second embodiment. The other arrangements and operations of the annular magnet 4 are the same as the second embodiment.

Figure 5:
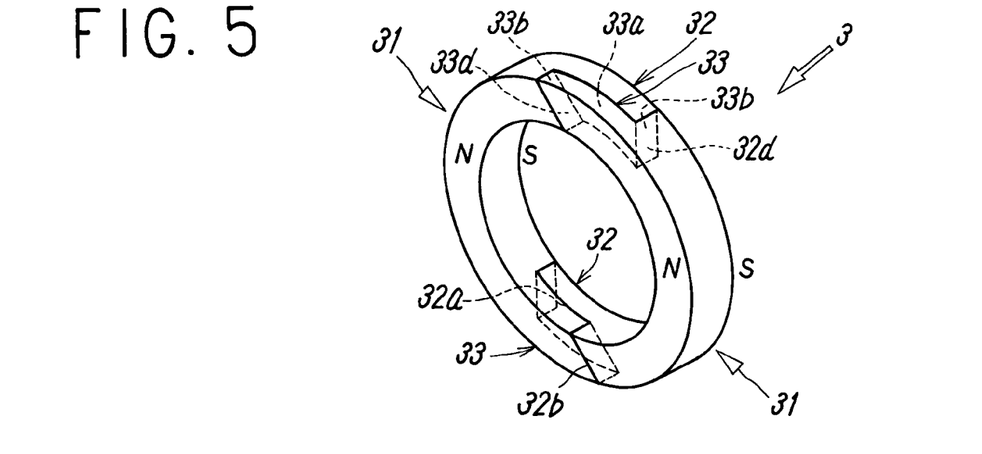
FIG. 5 is a perspective view showing an annular magnet of a third embodiment of the present invention.

It is noted that a projection and a recess similar to those of the first embodiment may be also formed to the joint surfaces of the annular magnet shown in FIGS. 4 to 6 and may be engaged with each other.

Figure 7A:
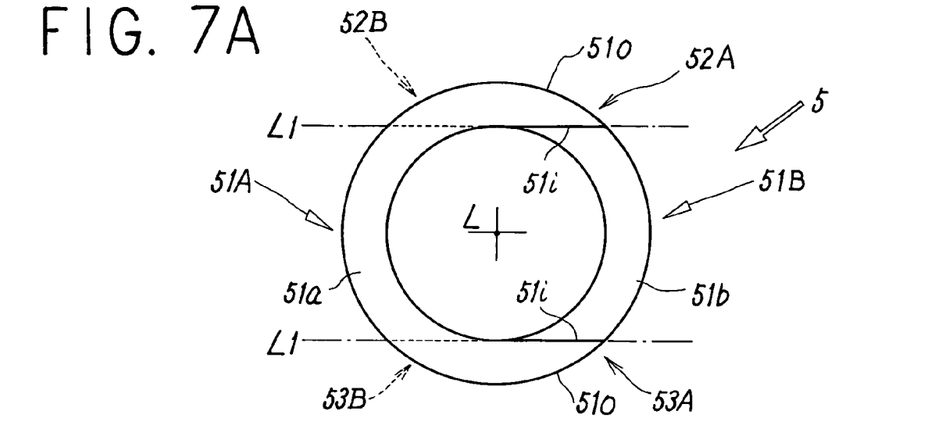
FIG. 7A is a front elevational view showing an annular magnet of a fifth embodiment of the present invention.
Figure 7B:
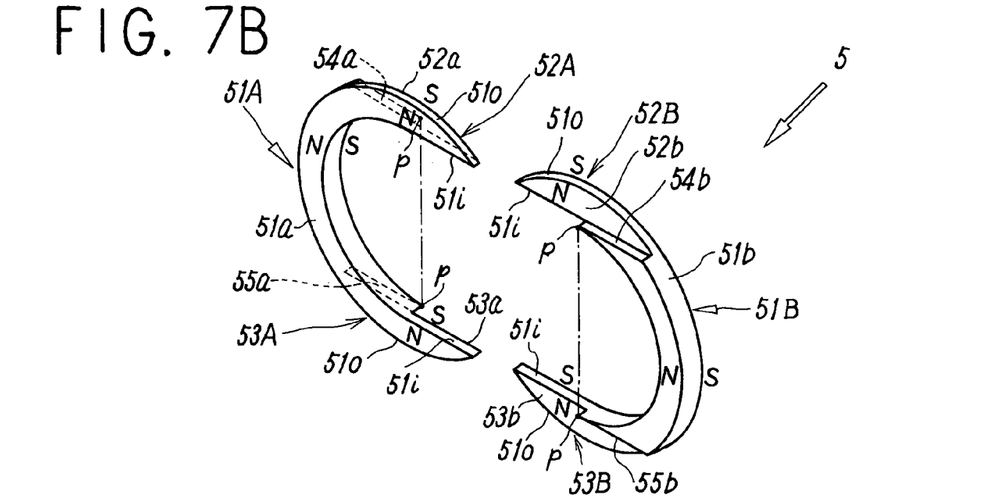
FIG. 7B is an exploded perspective view showing the annular magnet of FIG. 7A by exploding it.

FIGS. 7A and 7B show a fifth embodiment of an annular magnet. The annular magnet 5 is formed of first and second divided magnets 51A and 51B and has joint portions whose shape is different from the divided magnets 21, 21 of the second embodiment of FIG. 4.

That is, the divided magnets 51A and 51B are composed of arc-shaped main portions 51a, 51b and joint portions 52A, 53A and 52B, 53B formed at both the sides of the main portions. The width and the thickness of the main portions 51a, 51b are the same as the width W and the thickness T of the annular magnet 5 (refer to FIG. 1). Further, the joint portions 52A, 53A and 52B, 53B have a shape formed by partitioning a part of the annular magnet 5 along straight lines L1 that are in contact with the inner circumferential circle of the annular magnet 5 and parallel with each other. Accordingly, the shape thereof is a half-moon shape surrounded by an inner circumferential contour portion 51i extending straight along the straight line L1 and an arc-shaped outer circumferential contour portion 51o extending along the outer circumference of the annular magnet 5. The width of the joint portions 52A, 53A and 52B, 53B is approximately one half the width W of the annular magnet 5.

In the first divided magnet 51A, any of the joint portions 52A, 53A at both the ends of it is formed to a state in which it is biased to the side of an N-pole surface. Further, in the second divided magnet 51B, any of the joint portions 52B, 53B at both the ends of it is formed to a state in which it is biased to the side of an S-pole surface. The side surfaces of the joint portions 52A, 53A and 52B, 53B have dented sides which are made to form the joint surfaces 52a, 53a and 52b, 53b that are joined to the joint portions of the other divided magnet. Further, stepped end surfaces 54a, 55a and 54b, 55b that intersect with the respective joint surfaces at right angles are formed to the sides of the respective joint portions 52A, 53A and 52B, 53B dented in the width direction in the half portions of them located nearer to the base ends than the intermediate points (P points) of them.

When the joint portions 52A, 53A and the joint portions 52B, 53B, which are in a state of confronting with each other, are overlapped with each other in the direction of the axial line L of the annular magnet 5 from the above state as shown in FIG. 7B so that the joint surfaces 52a and 52b and 53a and 53b are joined to each other, the first and second divided magnets 51A and 51B are coupled integrally with each other by magnetic attraction force acting between the joint surfaces, the annular magnet 5 having an approximately given outside sectional shape as shown in FIG. 7A is thereby formed.

At this time, the extreme end side half portions of the joint portions 52A, 53A and 52B, 53B at both the ends of the two divided magnets 51A, 51B extend beyond the central region of the annular magnet 5 so as to overlap with the joint portions of the counterparts of them, thereby the extreme ends of the inner circumferential contour portions 51i are abutted on the stepped end surfaces 54a, 55a and 54b, 55b.

Figure 8:
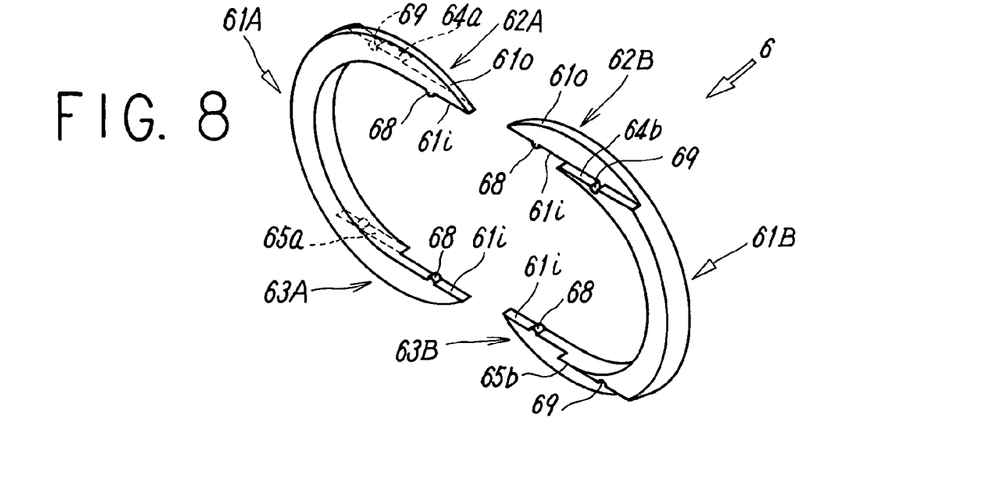
FIG. 8 is an exploded perspective view of an annular magnet of a sixth embodiment of the present invention.
Figure 9:
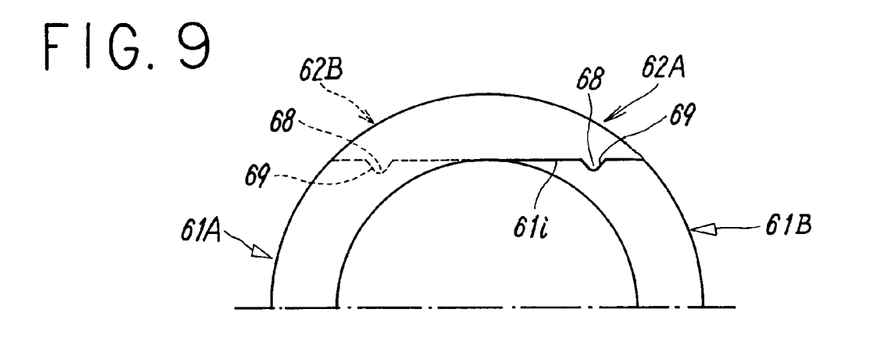
FIG. 9 is a partial front elevational view showing a part of FIG. 8 in enlargement.

FIG. 8 shows an annular magnet 6 of a sixth embodiment by exploding it, and FIG. 9 shows a part of it in enlargement.

The basic arrangement of divided magnets 61A, 61B of the annular magnet 6 is the same as the fifth embodiment of FIG. 7 except that projections 68 are formed respectively to one or more to circumferential contour portions 61i and stepped end surfaces 64a, 65a and 64b, 65b abutted against the contour portions 61i of joint portions 62A, 63A and 62B, 63B, and recesses 69 are formed to the others thereof so that the projections 68 are engaged with the recesses 69. When the annular magnet 6 is formed by joining the first divided magnet 61A to the second divided magnet 61B, the projections 68 and the recesses 69 prevent them from being dislocated in a direction in which they are separated from each other.

It should be noted that, in the annular magnets 5 and 6 of the fifth and sixth embodiments, the joint portions 52A, 53A and 62A, 63A at both the ends of the first divided magnets 51A and 61A are formed in a state such that any of the same are biased to the side of the N-pole surface and the joint portions 52B, 53B and 62B, 63B at both the ends of the second divided magnets 51B and 61B and are formed in a state such that each of them is biased to the side of the S-pole surface. Accordingly, these two divided magnets 51A, 51B and 61A, 61B are magnetized in an opposite direction although they have the same outside shape.

However, one or more of the joint portions 52A, 53A and 62A, 63A of any of the first and second divided magnets 51A, 61A and 51B, 61B maybe biased to the side of the N-pole and the other ones of them may be biased to the side of the S-pole. With this arrangement, both the divided magnets 51A, 61A and 51B, 61B can be formed to have the same arrangement in which they have the same outside shape and the same magnetizing direction.

Figure 10:
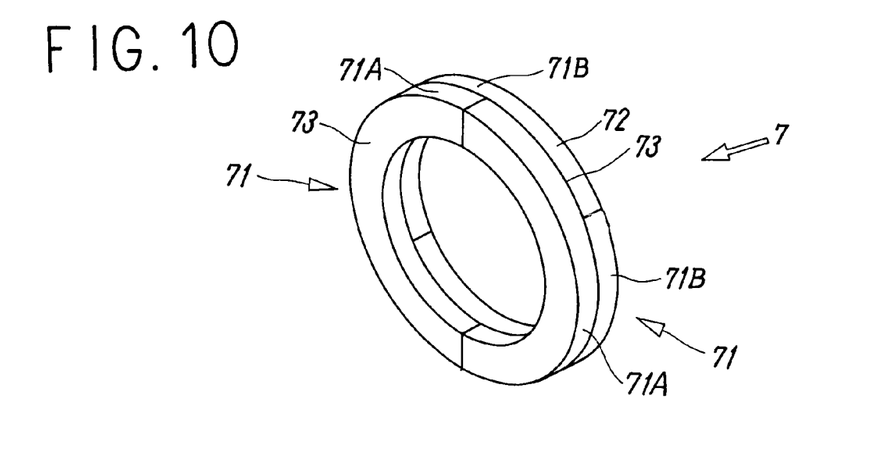
FIG. 10 is a perspective view showing an annular magnet of a seventh embodiment of the present invention.
Figure 11:
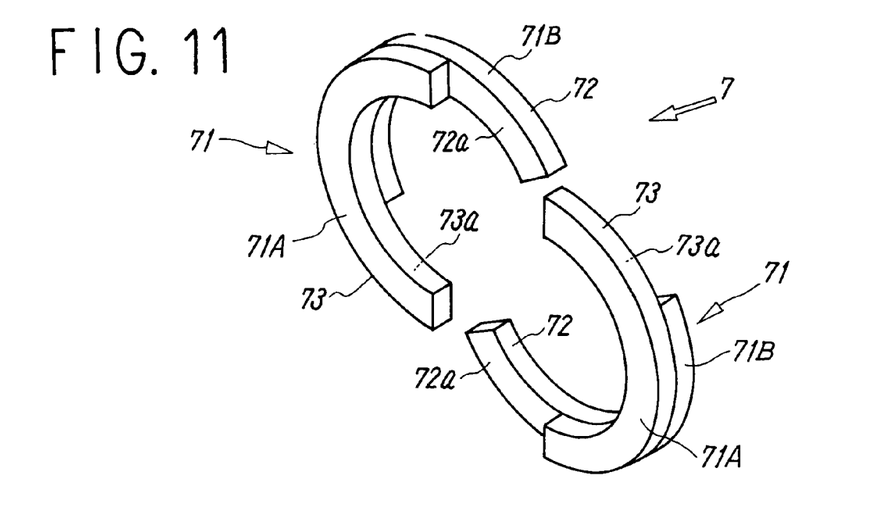
FIG. 11 is an exploded perspective view showing the annular magnet of FIG. 10.

FIGS. 10 and 11 show a seventh embodiment of an annular magnet of the present invention. The annular magnet 7 of the seventh embodiment is composed of two divided magnets 71, 71, and each divided magnet 71 is composed of two semicircular magnet pieces 71A, 71B. The divided magnet 71 is formed by dislocating the positions of the semicircular magnet pieces 71A, 71B in a circumferential direction, overlapping them in a width direction, and magnetically attracting them to each other. Then, each of joint portions 72, 73 is formed by the end of each of the two magnet pieces 71A, 71B projecting from the other magnet piece. The side surfaces of the joint portions 72, 73 act as joint surfaces 72a, 73a.

The above-mentioned arrangement of the divided magnet 71 is substantially the same as the one obtained by dividing the divided magnet 21 of the second embodiment shown in FIG. 4 in accordance with the width of the joint portions 22, 23. Accordingly, the annular magnet 7 is formed by laminating the four magnet pieces 71A, 71B to two layers in an axial direction.

The lengths of the joint portions 72, 73 in the divided magnets 71 can be adjusted by changing the amount of dislocation of the two magnet pieces 71A, 71B. When the magnet pieces 71A, 71B are dislocated just one half the length of them, the two-layered magnet pieces 71A, 71B are located at positions whose center angle is different 90° from each other.

Since the annular magnet 7 can be made from four magnet pieces having the same arrangement, it can be made easily at low cost. Further, when the annular magnet 7 is attached to an annular groove or the like of a piston, the respective magnet pieces are sequentially assembled while dislocating the phases of them in a circumferential circuit so that they are coupled with each other by magnetic attraction force.

It is noted that a projection and a recess similar to those of the annular magnet 1 of the first embodiment may be formed to front and back joint surfaces 72a73a also in the annular magnet 7.

FIGS. 12 and 13 show an embodiment of a fluid pressure cylinder to which an annular magnet of the present invention is attached, and, in the embodiment, the annular magnet 5 of the embodiment 5 shown in FIG. 7 is used.

As shown in FIG. 12, the fluid pressure cylinder of the embodiment has a cylinder tube 81 and a piston 82 slidably accommodated in the cylinder tube 81, and a piston rod 83 is coaxially fixed to the piston 82. An annular groove 84 is formed around the piston 82 so that a magnet is inserted into it, and the annular magnet 5 is fitted into the annular groove 84.

A magnet sensor 85 is attached to the outside of cylinder tube 81, and an operating position of the piston 82 is detected by the magnet sensor 85. Any arbitrary method may be employed as a method of attaching the magnet sensor 85 to the cylinder tube 81.

As shown in FIG. 13, the annular magnet 5 is attached by inserting the first and second divided magnets 51A, 51B into the annular groove 84 of the piston 82 from both sides thereof in the directions of the arrows shown and magnetically positioning them in the annular groove.

When the annular magnet 5 is inserted, a slight gap is formed on the outer circumference of the annular groove 84, and a wearing 86 is attached to the gap to cover the annular magnet 5. The annular magnet 5 is protected by providing the wearing 86 protects, and, at the same time, the attached state of the annular magnet 5 is stably kept by it.

Figure 14:
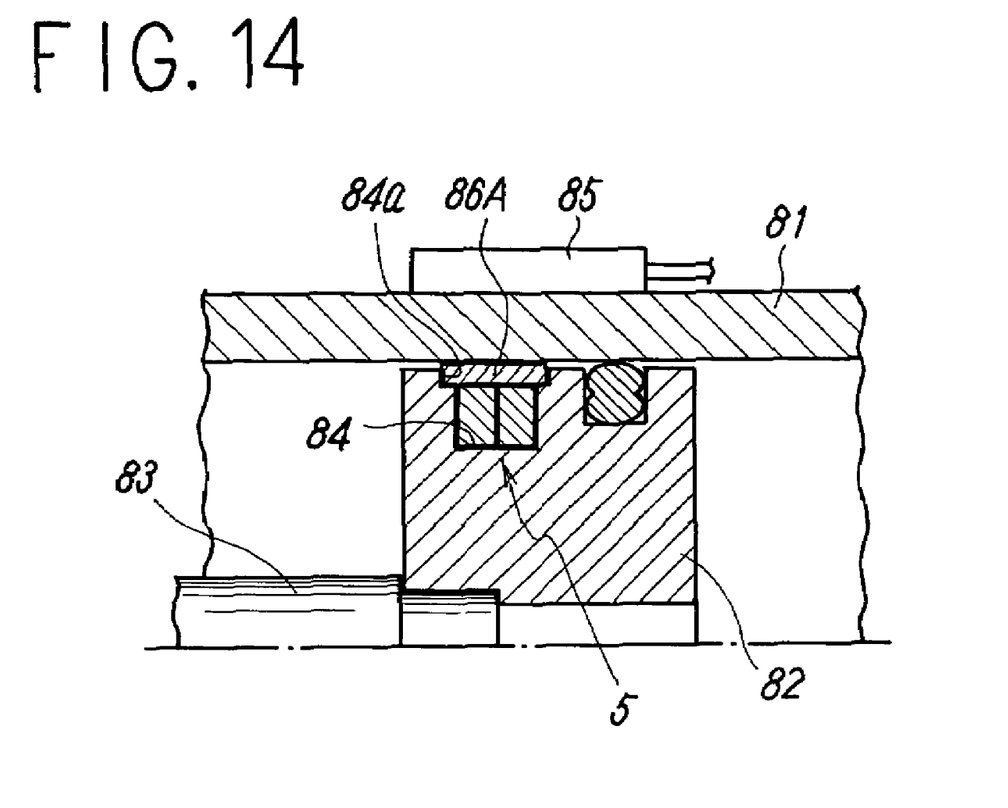
FIG. 14 is a partial sectional view showing an example of another arrangement of the fluid pressure cylinder to which an annular magnet of the present invention is attached.

FIG. 14 shows a modification of the fluid pressure cylinder to which the annular magnet 5 of the present invention is attached. A wearing attachment portion 84a having an increased groove width is formed to the outer circumferential portion of the annular groove 84 of the piston 82, and a wearing 86A having a lateral width larger than the width of the annular magnet 5 is attached to the wearing attachment portion 84a. Accordingly, since the wearing 86A covers the annular magnet 5 in an area wider than the thickness of it, the piston 82 can be more stably slid.

Note that, although the embodiments of FIGS. 12 and 14 show typical examples using the annular magnet 5 of FIG. 7, it is needless to say that the embodiments may be used in the annular magnet of any of the embodiments. Further, a piston packing may be used in place of the wearings 86, 86A.

Although any of the annular magnets of the respective embodiments described above is composed of a plurality of parts, the parts are integrated with each other by magnetic force. Accordingly, a fixing job need not be carried out using an adhesive and the like, and when the annular magnets are attached to a piston and the like, they are mechanically stable to vibration and chock when they are used.

Further, when the annular magnet is attached to the piston, since such can be also attached easily to a small cylinder, in which it is mechanically difficult to employ a divided structure to a piston, a fluid pressure cylinder having a piston and a piston rod arranged integrally with each other, and the like may be utilized. As a result, it is possible to provide an apparatus to which the annular magnet is attached less expensively.

It should be noted that the present invention is by no means limited to the embodiments described above and can employ various arrangement within a scope that does not depart from the spirit of the appended claims.

The invention claimed is:

1. An annular magnet which comprises:
   a plurality of arc-shaped divided magnets coupled with each other in an annular shape and which are magnetized with N and S magnetic poles on both end surfaces thereof in an axial direction: and
   a plurality of divided magnets having joint portions at both ends thereof so that the divided magnets are joined to each other wherein each of the joint portions has a joint surface configured to overlap the joint portions of adjacent divided magnets in an axial direction thereof, the joint surface thereof being magnetized so as to have a magnetic pole different from that of a joint surface to which the joint surface is joined, and wherein the divided magnets are coupled with each other by a magnetic attraction force of the different magnet poles.

2. An annular magnet according to claim 1, wherein the respective divided magnets are arranged such that the joint portions thereof are formed so as to be narrower than a width thereof and a total width thereof when the joint portions of adjacent divided magnets are joined to one another is equal to a width dimension thereof.

3. An annular magnet according to claim 2, wherein each of the divided magnets is positioned such that one of the joint portions thereof is biased to a side of an N-pole surface and another joint portion is biased to a side of an S-pole surface, an S-pole thereof is magnetized to the joint surface of the joint portion biased to a side of the N-pole surface, and an N-pole is magnetized to the joint surface of the joint portion biased to a side of the S-pole surface.

4. An annular magnet according to claim 2, wherein the plurality of divided magnets comprise divided magnets having at least one joint portion at both the ends thereof which is biased to the side of an S-pole surface and divided magnets any of the joint portions of each of which at both the ends thereof is biased to a side of an N-pole surface, an S-pole thereof is magnetized to the joint surfaces of the joint portions biased to the side of the N-pole surface, and an N-pole thereof is magnetized to the joint surfaces of the joint portions biased to a side of the S-pole surface.

5. An annular magnet according to claim 3, wherein each of the joint portions has an arc-shaped outer circumferential contour portion extending along the outer circumference of the annular magnet and an arc-shaped inner circumferential contour portion extending along the inner circumference of the annular magnet, and the joint portion is formed so as to have an arc shape over an entire portion thereof and has a thickness equal to a magnet thickness thereof.

6. An annular magnet according to claim 4, wherein each of the joint portions has an arc-shaped outer circumferential contour portion extending along the outer circumference of the annular magnet and an arc-shaped inner circumferential contour portion extending along the inner circumference of the annular magnet, and wherein the joint portion is formed to have an arc shape along an entire portion thereof and has a thickness equal to magnet thickness thereof.

7. An annular magnet according to claim 3, wherein the annular magnet comprises two divided magnets, the joint portions at both ends thereof has an arc-shaped outer circumferential contour portion extending along an outer circumference of the annular magnet and an inner circumferential contour portion extending along a straight line in contact with an inner circumference of the annular magnet, such that each of the joint portions is formed so as to be of a half-moon shape.

8. An annular magnet according to claim 4, wherein the annular magnet comprises two divided magnets, wherein joint portions at both ends thereof has an arc-shaped outer circumferential contour portion extending along the outer circumference of the annular magnet and an inner circumferential contour portion extending along a straight line in contact with the inner circumference of the annular magnet, such that each of the joint portions is formed so as to be of a half-moon shape.

9. An annular magnet according to claim 1, wherein a projection and a recess, which are engaged with each other, are formed at the joint portions, which are joined to each other, of adjacent divided magnets.

10. An annular magnet according to claim 5, wherein a projection and a recess, which are engaged with each other, are formed at the joint portions, which are joined to each other, of adjacent divided magnets.

11. An annular magnet according to claim 6, wherein a projection and a recess, which are engaged with each other, are formed at the joint portions, which are joined to each other, of adjacent divided magnets.

12. An annular magnet according to claim 7, wherein a projection and a recess, which are engaged with each other, are formed at the joint portions, which are joined to each other, of adjacent divided magnets.

13. An annular magnet according to claim 8, wherein a projection and a recess, which are engaged with each other, are formed at the joint portions, which are joined to each other, of adjacent divided magnets.

14. An annular magnet according to claim 5, wherein each of the divided magnets comprises two arc-shaped magnet pieces, the divided magnet is formed by overlapping the magnet pieces while dislocating the positions thereof in a circumferential direction, and wherein the joint portions are formed by the end portions each of the magnetic pieces.

* * * * *